United States Patent [19]

Ashe et al.

[11] Patent Number: 4,785,370
[45] Date of Patent: Nov. 15, 1988

[54] DISK BRAKE MECHANISM FOR A DISK CARTRIDGE

[75] Inventors: Philip R. Ashe, Hilton; James R. Carey, Rochester, both of N.Y.; Patrick J. Champagne, Cupertino, Calif.; David L. Rowden, Rochester, N.Y.

[73] Assignee: Verbatim Corporation, Sunnyvale, Calif.

[21] Appl. No.: 60,000

[22] Filed: Jun. 9, 1987

[51] Int. Cl.⁴ .............................................. G11B 23/03
[52] U.S. Cl. .................................................... 360/133
[58] Field of Search ................ 360/133, 131; 369/291, 369/77.2; 206/444, 309–313

[56] References Cited

U.S. PATENT DOCUMENTS

| | | | |
|---|---|---|---|
| 3,416,150 | 12/1968 | Lindberg, Jr. | 360/133 |
| 3,529,301 | 9/1970 | Hisuta | 360/133 |
| 4,617,655 | 10/1986 | Aldenhoven | 360/133 X |
| 4,724,962 | 2/1988 | Watanabe et al. | 360/133 |

FOREIGN PATENT DOCUMENTS 0137965  4/1985  European Pat. Off. ............ 360/133
0050680  3/1985  Japan .

Primary Examiner—Stuart N. Hecker
Assistant Examiner—David J. Severin
Attorney, Agent, or Firm—Dennis P. Monteith

[57] ABSTRACT

A disk cartridge comprises top and bottom opposed spaced-apart plates defining a compartment in which an information recording disk is rotatable. A front peripheral wall joins the top and bottom plates with an aperture in the front peripheral wall communicating with the compartment. The disk cartridge is provided with a brake mechanism that latches the disk axially and radially in an operative plane until the cartridge is inserted fully into a drive mechanism. The brake mechanism also functions to protect the disk against damage, abrasion, cracking and the like, by eliminating annoying rattling when the cartridge is jostled during transporting or in handling. The disk brake mechanism comprises a unitary spring-biased pivotally mounted brake member on one side of the disk center for engaging the periphery of the disk and clamping the disk between the brake member and a pair of angularly spaced nooks located on the opposite side of the disk center.

1 Claim, 2 Drawing Sheets

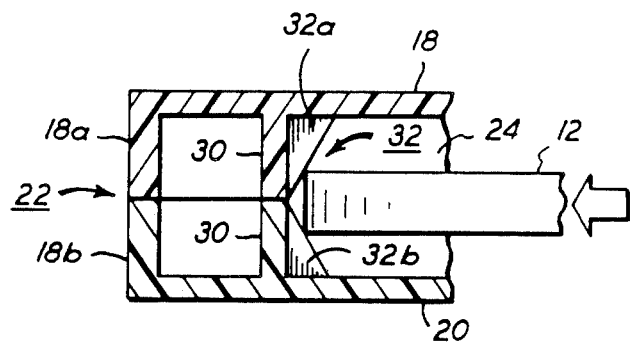
FIG. 2
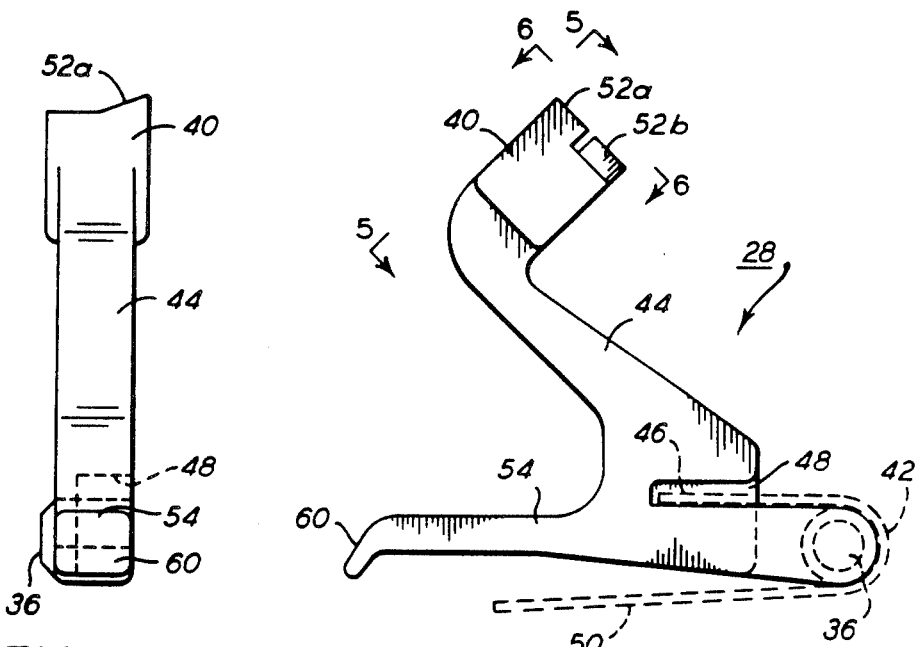
FIG. 4
FIG. 3
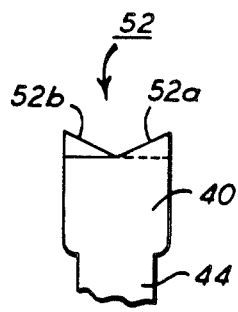
FIG. 5
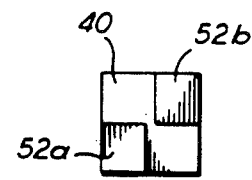
FIG. 6

DISK BRAKE MECHANISM FOR A DISK CARTRIDGE

CROSS-REFERENCE TO RELATED APPLICATION

Reference is made to U.S. patent Application Ser. No. 059,999, entitled A DISK CARTRIDGE by P. R. Ashe, J. R. Carey, P. J. Champagne and D. L. Rowden, filed on June 9, 1987.

1. Field of the Invention

The present invention relates generally to cartridges, and more specifically, to a disk brake mechanism for a disk cartridge.

2. Description Of The Prior Art

U.S. Pat. No. 3,416,150 which issued to C. A. Lindberg on Dec. 10, 1968 discloses a cartridge having a compartment within which an information recording disk is rotatably mounted. A brake mechanism comprising a plurality of interacting levers is provided for applying a braking force to the peripheral edge of the disk for clamping the disk against a pair of nooks to prevent the disk from rattling around within the compartment when the cartridge is in a non-recording/playback position.

Although the prior known braking mechanism generally achieves the objective of protecting the disk against damage from abrasion, cracking and the like by eliminating the rattling and bouncing of the disk within the compartment during handling or transporting of the cartridge, a serious shortcoming of the brake mechanism is that it is of rather complicated construction and design involving a large number of interacting parts.

SUMMARY OF THE INVENTION

In a preferred embodiment of the present invention, a disk brake mechanism for a cartridge containing an information recording disk is disclosed comprising:

two opposed spaced-apart top and bottom plates defining a compartment in which an information recording disk is rotatable, and a front peripheral wall joining the top and bottom plates with an aperture in the front peripheral wall communicating with the compartment;

a unitary brake member mounted on a pivot on one of the top and bottom plates for pivotal movement between disk braking and disk releasing positions, the brake member having a first leg thereof in alignment with the aperture and a second leg having an end nose portion extending generally radially of the disk on one side of the center of the disk;

a pair of angularly spaced-apart nooks defined by the top and bottom plates along the periphery of the disk on the opposite side of the center of the disk; and resilient means mounted within the compartment for biasing the brake member to its disk braking position causing end nose portion to engage the periphery of the disk and urge the disk into engagement with the nooks for immovably holding the disk within the cartridge.

In more specific aspects of the invention, each nook comprises two opposed ramps on the top and bottom plates forming a V-shaped recess facing the periphery of the disk for guiding the disk into an operating position out of engagement with the top and bottom plates. The brake member is generally V-shaped in which the first leg is one leg of the V, the second leg is the other leg of the V, and the pivot is at the junction of the legs. The brake member further has a generally radial slot. The resilient means comprises a generally U-shaped spring for receiving the pivot end of the brake member with an arm of the spring inserted in the radial slot and the other arm engageable with a side wall of the cartridge.

A primary advantage of this invention is to provide an improved disk brake mechanism for a cartridge containing an information recording disk. The disk brake mechanism is of simple design and construction involving a minimum of parts, is thoroughly reliable and efficient in operation, and economical to manufacture. The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 2 is a segmental view in section showing a nook in the cartridge against which a peripheral edge of the disk is clamped;

FIG. 3 is a top plan view of the brake member with the spring shown by dotted lines;

FIG. 4 is a left side elevational view of the brake member of FIG. 3;

FIG. 5 is a segmental elevational view of the nose-portion of the brake member taken substantially from line 5—5 of FIG. 3; and FIG. 6 is a segmental elevational view of the nose-portion taken substantially from line 6—6 of FIG. 3.

DETAILED DESCRIPTION OF THE INVENTION

Figure 1:
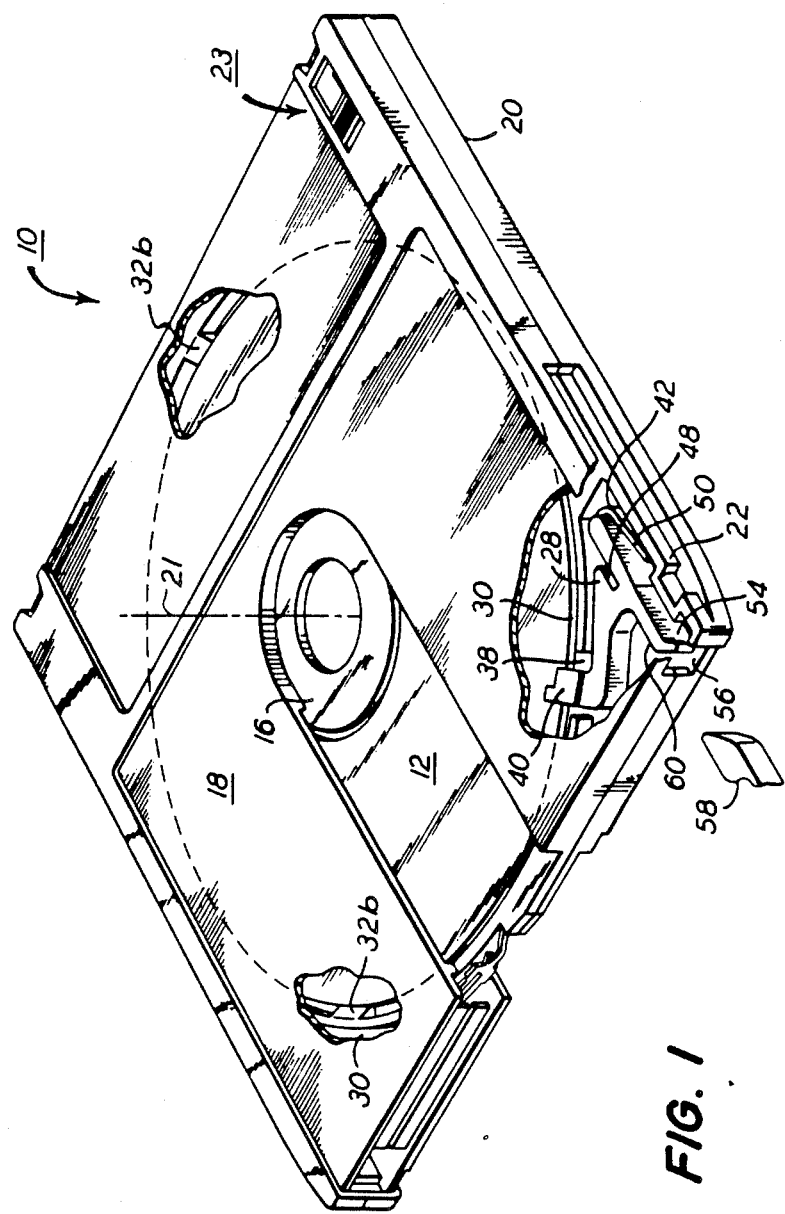
FIG. 1 is a top perspective view of a disk cartridge with the shutter omitted and the top plate broken away to show a preferred embodiment of the disk brake mechanism of this invention.

FIG. 1 illustrates a presently preferred embodiment of a cartridge 10, in accordance with the invention, containing an information recording disk 12 adapted for recording data on, and playing back data from, a plurality of concentric record tracks encircling a central spindle-drive region 16 of disk 12. The cartridge 10 comprises a top plate 18 and a bottom plate 20, as viewed in FIG. 1, composed of a material to provide structural rigidity. Preferably, both plates 18, 20 are plastic and are formed by a commercially available injection molding operation.

The top plate 18 and bottom plate 20 are generally of a size to accommodate a disk of standard size, for example 3½ inch, 4¾ inch (compact disk), 5¼ inch, 8 inch or the like to permit rotatable movement of disk therebetween about a central axis of rotation 21. To that end, each plate 18, 20 has an integral peripheral lip 18a, 20a, respectively (see FIG. 2), cooperatively forming a surrounding peripheral wall 22 which serves to space the lower surface of top plate 18 from the upper surface of bottom plate 20. Thus, peripheral wall 22 together with top plate 18 and bottom plate 20 define the outer dimensions of a generally enclosed rigid compartment 24 in which disk 12 is contained for rotatable movement. A write protection device, indicated generally by reference number 23, is located near a corner of the cartridge where it does not interfere with disk 12.

With reference to FIGS. 1 and 3, a brake mechanism comprising a unitary generally V-shaped brake member 28 serves to facilitate cartridge-loading by locating disk 12 within an operating plane in cartridge compartment 24. To that end, the brake mechanism serves for clamping disk 12 axially, as well as radially, in its operative plane until cartridge 10 is inserted fully into a drive mechanism. The term "operative plane" as used herein shall mean and refer to the plane actually occupied by disk 12 during a recording/playback operation.

This disk clamping, particularly in the axial direction, serves to facilitate the loading of disk 12 without axial cartridge movement. The clamping also functions to protect disk 12 against damage from abrasion, cracking and the like, by eliminating rattling when cartridge 10 is jostled during transporting or in handling.

For the purpose of clamping disk 12, each one of the plates 18, 20 has a circular generally centrally aligned fence 30. The diameter of each fence 30 is slightly larger than the diameter of disk 12. Thus, when top plate 18 and bottom plate 20 are brought together, the two fences 30, which are integral with their respective plates, cooperatively encircle disk 12.

With particular reference to FIG. 2, the brake mechanism further comprises two pairs of corresponding ramp-like projections 32a, 32b on the concave (inwardly facing) side of each fence 30. The projections 32a, 32b cooperatively form a spaced pair of V-shaped nooks 32 centered at the interface common to the two fences 30, and the operative plane of disk 12.

Referring to FIGS. 1 and 3-6, spring biased brake member 28 is pivotally mounted on bottom plate 20 by means of a spindle 36 (FIG. 4) nesting within a complementary recess, not shown, in bottom plate 20. Brake member 28 serves to axially clamp disk 12 within each nook 32. For that purpose, each fence 30 has a small arcuate opening 38 through which a nose portion 40 of brake member 28 protrudes in a generally radial direction under the influence of its V-shaped bias spring 42. Nose 40 is integral with and substantially perpendicular to a leg 44 of brake member 28, and spring 42 has one arm 46 extending in a slot 48 and its other arm 50 engageable with the side peripheral wall 22. The disk-engaging surface of nose portion 40 has cooperating projections 52a, 52b which, like the cooperating projections 32a, 32b, form a V-shaped nook 52, as best seen in FIGS. 5 and 6.

In its spring-biased position, nose portion 40 abuttingly engages a peripheral edge of disk 12 and thereby urges the opposing edge of disk 12 into the vertex of each V-shaped nook 32. In that position, disk 12, under the guiding action of each V-shaped nook 32 and nook 52 in nose portion 40, is clamped not only radially against the base of each nook 32, 52, as shown in part in FIG. 2, but is suspended axially, centered substantially in its operative plane, between the lower surface of top plate 18 and the top surface of bottom plate 20. Although at least two V-shaped nooks 32, in addition to nook 52 in nose portion 40, are required for clamping, we have found that the location of each nook is not particularly important, as long as they are properly spaced for supporting disk 12.

Referring back to FIG. 1, an integral leg 54 of brake member 28 serves for releasing the brake member when cartridge 10 is fully inserted into a drive mechanism. To that end, leg 54 is accessible through an aperture 56 in a corner of the front peripheral wall 22. A fixed reference member 58 (FIG. 1) such as a post, pin or the like, of a disk drive mechanism enters aperture 56 upon insertion of the cartridge, engages a cam surface 60 of leg 54, and pivots brake member 28 in a counter-clockwise direction against the influence of spring 42. This releases the brake mechanism by retracting nose portion 40 from the disk periphery which permits axial and radial clearance inside compartment 24 for rotating disk 12 in response to a drive-spindle (not shown).

The invention has been described in detail with particular reference to a preferred embidment thereof, but it will be understood that variations and modifications can be effected within the spirit and scope of the invention.

What is claimed is:

1. In a cartridge comprising opposed first and second spaced-apart plates defining an internal compartment in which a rotatable information recording disk is disposed, the improvement comprising:
   (a) a peripheral wall, joining said spaced-apart plates, having an aperture in a forwardly facing portion thereof communicating with a corner of said internal compartment;
   (b) a unitary generally V-shaped brake member mounted in said corner of said compartment on a pivot, disposed at the vertex of the V and connected to one of said first and second plates, for pivotal movement between a disk-braking position and a disk-releasing position, one leg of said V-shaped brake member extending toward said forwardly facing peripheral wall and terminating in an exposed position adjacent to and in alignment with the aforementioned aperture of said peripheral wall and a second leg of said V-shaped brake member terminating in a nook-like nose portion adjacent to and facing a circumferential edge of the disk;
   (c) a pair of stationary V-shaped nooks each of which is defined by first and second ramp-like mating portions integral, respectively, with said first and second plates, said pair of nooks being angularly spaced apart from one another facing a circumferential edge of the disk generally diametrically opposed to the circumferential edge of the disk adjacent said nook-like nose portion of said brake member; and
   (d) a U-shaped spring mounted to receive the vertex of said brake member with one arm of said spring pressed against a side peripheral wall of said cartridge and the other arm of said spring seated in a slot of said brake member, said spring being arranged to produce a bias force normally pivoting said brake member into its disk-braking position wherein said nook-like nose portion is caused to engage the adjacent circumerential edge of the disk and to thereby urge the opposite circumferential edge of the disk into engagement with said stationary nooks for immovably holding the disk within said cartridge, said spring producing a bias force of a magnitude that is overcome by direct engagement, through the aperture of said forwardly facing peripheral wall, of said first leg of said brake member with a disk drive mechanism when said cartridge is operatively loaded into such drive mechanism, whereby operative loading movement of said cartridge causes the drive mechanism to move said brake member, against the bias force of said spring, from its disk-braking position to its disk releasing position.

* * * * *